2,980,494
METHOD OF DECOMPOSING OZONE

Arthur C. Jenkins, Tonawanda, and Adam H. Malik, Buffalo, N.Y., and Roy L. Pruett, Charleston, W. Va., assignors to Union Carbide Corporation, a corporation of New York No Drawing. Filed Apr. 13, 1959, Ser. No. 805,704

7 Claims. (Cl. 23—4)

This invention relates to an improved method of decomposing ozone and more particularly concerns a novel method of decomposing ozone employing activated crystalline molecular sieve zeolites as catalysts.

We have discovered a new method of decomposing ozone through the use of zeolites as catalysts. The new method is so effective that it will decompose traces of ozone gas which measure a fraction of a part per million. This minute concentration can be of great importance in many industrial fields as well as in the field of air pollution, since small quantities of ozone in the atmosphere can be extremely harmful.

The value of the threshold limit or minimum acceptable concentration of ozone as adopted by the American Conference of Governmental Industrial Hygienists is 0.1 part per million in air. Because ozone is strongly irritating to the upper respiratory system, the nose is remarkably sensitive to trace amounts. It is known that the nose can detect the odor of concentrations of as low as 0.015 part per million. (Reference: N. A. Sax, "Dangerous Properties of Industrial Materials," Reinhold, New York, 1957, page 977.)

It is known that at ordinary temperatures and low concentrations, ozone decomposes slowly. Also, the decomposition of ozone may be catalyzed by platinum black, manganese dioxide, soda lime, nickelous carbonate or cocoanut charcoal. However, many of these materials must be heated to develop any effective decomposition ability. For example, manganese dioxide and platinum black are usually contained in a hot tube through which the ozone is passed.

Activated cocoanut charcoal is a satisfactory catalytic agent for decomposing ozone, but because it is combustible it would be hazardous if used with ozone-in-oxygen gas mixtures. Soda lime, while it is a satisfactory ozone decomposition catalyst, becomes caked with slaked lime when in contact with moisture and $CO_2$. Also, it cannot be regenerated and is difficult to remove from the container when spent. Manganese dioxide and nickelous carbonate, when used in powder form, require catalyst support pellets to prevent packing of the powder.

It is, therefore, an important object of the present invention to provide an improved method of decomposing ozone without requiring the supply of heat or chemical reactants.

Another object of the present invention is to provide in the decomposition of ozone, an improved catalyst which is effective at or below room temperature, and which will not require heating above room temperature.

Other features and advantages of the present invention will be apparent to those skilled in the art from the following detailed description of certain embodiments thereof.

According to the process of this invention, natural and synthetic crystalline zeolites of the molecular sieve type, when suitably activated, have been found to be excellent decomposition catalysts for ozone, even at temperatures substantially below room temperature. For this purpose, the activated crystalline molecular sieve zeolites can be conveniently incorporated into capsules or cartridges in either pellet, powder, granule or other convenient forms. In such form the catalyst can be effectively used in such equipment as gas masks, ventilating systems, and chemical apparatus.

Crystalline zeolitic molecular sieves may be defined as three-dimensional aluminosilicates in which the rigid crystal structure is not destroyed, collapsed nor substantially altered when essentially all of the water is removed from the pores within the crystal lattice.

Catalysts of ozone decomposition in accordance with the invention is not confined to the surface of the zeolite or the inner cavities in the zeolite. Consequently, the zeolite to be used in the practice of the invention can be a naturally occurring crystalline molecular sieve zeolite or a synthetic crystalline molecular sieve zeolite or any combination thereof. Because of the variety of crystalline zeolites that are susceptible of use in the decomposition of ozone, the zeolite material is not limited to a particular pore size or a narrow range of pore sizes. It can have a pore size ranging from between about 2 angstroms and 10 angstroms. Examples of synthetic crystalline molecular sieve zeolites that have been found to be very effective in promoting the decomposition of ozone include zeolite A and zeolite X. The synthetic crystalline molecular sieves type A and type X are disclosed in copending U.S. applications of R. M. Milton, Serial No. 400,388 and Serial No. 400,389 now Patent Nos. 2,882,243 and 2,882,244, respectively.

Among the other synthetic molecular sieve zeolites that may be used in the improved method of the invention are zeolite L, disclosed in copending U.S. application of D. W. Breck and N. A. Acara, Serial No. 711,565, filed January 28, 1958; zeolite Y, disclosed in copending U.S. application of D. W. Breck, Serial No. 728,057, filed April 14, 1958; zeolite R, disclosed in copending U.S. application of R. M. Milton, Serial No. 680,381, filed August 26, 1957; zeolite D, disclosed in copending U.S. application of D. W. Breck et al., Serial No. 680,383, filed August 26, 1957; and zeolite T, disclosed in copending U.S. application of D. W. Breck et al., Serial No. 733,819, filed May 8, 1958, now U.S. Patent No. 2,950,952 issued August 30, 1960. Therefore, a complete description of these zeolites will not be given here.

Examples of naturally-occurring crystalline zeolitic molecular sieves which are admirably suited in the practice of the present invention are faujasite, erionite, chabazite, and mordenite.

The effectiveness of the catalyst varies with the temperature, a more efficient catalysis reaction occurring at higher temperatures, and progressively lower yields occurring as the temperature is reduced. The preferred temperature to be used in the practice of the invention is between about 26° C. and about —78° C., although higher or lower temperatures, even to approximately —140° C., wherein low concentrations ozone can exist as a gas, may be employed if so desired.

In the practice of the invention, the zeolite material is generally activated by heating it at a reduced pressure to remove substantially all of the water of crystallization and any adsorbed materials. With this water removed, the crystalline structure is left intact. The pores and cavities in the crystal structure as well as the external surface area can then serve as sites for catalytic activity. Typical activation conditions for sodium zeolite X are 350° C. and less than about 0.1 millimeter Hg absolute. However, it is to be understood that the choice of activation conditions for a given zeolite is largely governed by the structural stability of that particular zeolite and is not intended to limit the scope of the invention.

In order to indicate still more fully the nature of the present invention the following examples are set forth, it being understood that these examples are presented as illustrative only and that they are not intended to limit the scope of the invention.

The general procedure for determining the effectiveness of crystalline molecular sieve zeolite materials as decomposition catalysts for ozone was as follows:

A weighed sample of activated zeolite material was placed in a glass tube maintained at room temperature or immersed in a cooling medium. An ozone-oxygen mixture of known composition was passed through the tube. After several analyses the effluent gas indicated a constant composition. The flow was stopped and the tube closed off. In some instances, any ozone remaining on the sample was desorbed with a stream of oxygen and the desorbed ozone was then determined by the iodometric method employing KI.

In a typical example of ozone decomposition by an activated crystalline molecular sieve zeolite, an ozone-oxygen mixture containing 3 to 4 mole percent ozone was passed through a bed of activated sodium zeolite X pellets at a flow rate of about 1 to 2 c.f.h. The zeolite bed consisted of a 2-inch column of pellets contained in a glass tube about ¾" in diameter. The effluent gas was sent through a 2% KI solution. The flow of ozone-oxygen mixture was maintained for three minutes. During this time, there was no ozone in the effluent gas as evidenced by the fact that the KI solution did not liberate iodine and that there was no odor of ozone in the off-gas. (Most persons can detect ozone by its odor in concentrations of 0.1 p.p.m. or less, as previously stated.) As a further check on the completeness of ozone decomposition, the sodium zeolite X pellets were poured into KI. Again no iodine was liberated, indicating the absence of ozone.

In Table I are listed data on the relative efficiencies of several synthetic and natural molecular sieve zeolites as ozone decomposition catalysts. These data were obtained by the general procedure of the above paragraphs. The zeolite material generally was in the form of ⅛" pellets enclosed in 30 millimeter I.D. glass tubes 18" long.

TABLE I

*Ozone decomposition by molecular sieve zeolites*

| Zeolite Type | Input Composition, Mole-percent $O_3$ | Effluent Composition, Mole-percent $O_3$ | Temperature, °C. |
|---|---|---|---|
| 4A | 5.3 | 0.03 | Room Temp. |
|    | 2.2 | 0.005 | Do. |
| 5A | 5.3 | 0 | Do. |
|    | 2.2 | 0.01 | Do. |
| 13X | 5.3 | 0 | Do. |
|     | 2.2 | 0 | Do. |
| Natural Chabazite | 5.68 | 0 | Do. |
|                   | 5.68 | 0 | −78. |

It is apparent from Table I that extensive decomposition of ozone is produced by synthetic sodium zeolite A (4A), sodium zeolite X (13X), and calcium zeolite A (5A), and natural chabazite.

Additional tests have indicated that at temperatures down to about −78° C., complete destruction of 3 to 4 mole-percent ozone is accomplished by sodium zeolite X pellets.

Further evidence of the effectiveness of sodium zeolite X is shown by the fact that this material was employed on a continuous basis as a decomposition catalyst in a laboratory ozonizer. With this arrangement, 5 mole-percent ozone was completely decomposed, as evidence by the fact that no odor of ozone was ever detected in the effluent at the exit of the decomposer tube. Therefore, sodium zeolite X is especially useful when incorporated into cartridges for gas masks, ventilating systems and chemical apparatus.

In order to emphasize the distinction between the three dimensional crystaline molecular sieve zeolites of the invention and amorphous non-crystalline zeolites, an amorphous zeolite (used commercially as an ion-exchanger) was tested. Although at room temperature this material was effective in initiating decomposition of 5.68 mole-percent ozone in oxygen, in a test at −78° C. the ozone concentration in the effluent soon rose to 5.63 mole-percent, essentially the input concentration. This indicated that no decomposition was taking place, and therefore, the amorphous zeolite was much less effective.

It was found that the efficiency of a crystalline molecular sieve zeolite material for decomposing ozone decreases as it gradually becomes saturated with moisture. To protect the zeolite catalyst, use of a guard bed of another or the same activated molecular sieve is desirable. To both protect the zeolite catalyst and indicate when its decomposition ability is markedly reduced, use of a moisture-absorbing and indicating material is preferred. Any suitable moisture-collecting material which for this purpose can be incorporated in the same vessel or capsule as the molecular sieve can be used. Also, a separate material, such as a Drierite color indicating tube, may be employed, if so desired. Thus, a change in color of the moisture-collecting material can signal that the zeolite should be replaced or reactivated. In case of a decomposition unit used in a gas mask or in chemical apparatus, the spent capsule or cartridge may be discarded and replaced with a fresh unit. It is also possible to coat the molecular sieve with a solution of one of the moisture-indicating chemicals such as cobaltous chloride. After drying, the sieve is activated in vacuum to prevent decomposition of the cobalt salt.

It is to be noted that in the operation of the invention, the hazards of handling relatively high concentrations of ozone in oxygen should not be minimized. Gaseous ozone in concentrations above about 9 mole -percent (13 wt.-percent) should be handled with extreme caution, not only when in contact with the decomposition catalyst of the subject invention, but also under any conditions. With consideration for the necessity for safety precautions, attention is called to the article by G. A. Cooke et al. in Industrial and Engineering Chemistry, vol. 48, pp. 736–741 (1956), entitled "Explosion Limits of Ozone-Oxygen Mixtures."

It will be understood that modification and variations may be effected without departing from the spirit and scope of the invention.

What is claimed is:

1. A method of decomposing ozone comprising passing an ozone-containing gas through a crystalline zeolitic molecular sieve material at a temperature between about room temperature and approximately −150° C.

2. A method of decomposing ozone comprising passing an ozone-containing gas through a crystalline zeolitic molecular sieve material at a temperature between about room temperature and about −78° C.

3. A method according to claim 1, said zeolitic molecular sieve material consisting of at least one crystalline zeolite selected from the group consisting of zeolite A, zeolite D, zeolite R, zeolite T, zeolite X, zeolite Y, faujasite, erionite, chabazite and mordenite.

4. A method of decomposing ozone according to claim 1, said crystalline zeolitic molecular sieve material being sodium zeolite A.

5. A method of decomposing ozone according to claim 1, said crystalline zeolitic molecular sieve material being sodium zeolite X.

6. A method of decomposing ozone according to claim 1, said crystalline zeolitic molecular sieve material being calcium zeolite A.

7. A method of decomposing ozone according to claim 1, said crystalline zeolitic molecular sieve material being natural chabazite.

References Cited in the file of this patent

UNITED STATES PATENTS 2,298,607    Anderson    Oct. 13, 1942
2,865,720    Guild    Dec. 23, 1958